United States Patent
Ueno et al.

(10) Patent No.: US 10,041,645 B2
(45) Date of Patent: Aug. 7, 2018

(54) LIGHT SOURCE UNIT, LIGHTING DEVICE, AND VEHICLE

(71) Applicant: Panasonic Intellectual Property Management Co., Ltd., Osaka (JP)

(72) Inventors: Masatoshi Ueno, Hiroshima (JP); Masahiro Nishikawa, Osaka (JP); Hiro Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 15/201,946

(22) Filed: Jul. 5, 2016

(65) Prior Publication Data
US 2017/0009954 A1    Jan. 12, 2017

(30) Foreign Application Priority Data

Jul. 6, 2015  (JP) .................................. 2015-135517
Dec. 24, 2015  (JP) .................................. 2015-252222

(51) Int. Cl.
| | |
|---|---|
| *B60Q 1/00* | (2006.01) |
| *F21S 8/10* | (2006.01) |
| *F21S 41/19* | (2018.01) |
| *F21S 41/147* | (2018.01) |
| *F21S 41/39* | (2018.01) |

(Continued)

(52) U.S. Cl.
CPC .......... *F21S 48/328* (2013.01); *B60Q 1/0094* (2013.01); *F21S 41/147* (2018.01); *F21S 41/192* (2018.01); *F21S 41/39* (2018.01); *F21S 45/47* (2018.01); *F21S 45/49* (2018.01); *F21Y 2115/10* (2016.08)

(58) Field of Classification Search
CPC . B60Q 1/0094; F21S 48/1109; F21S 48/1159; F21S 48/1305; F21S 48/321; F21S 48/328; F21Y 2115/10
USPC ........................................................ 362/547
See application file for complete search history.

(56) References Cited

U.S. PATENT DOCUMENTS

| | | | | |
|---|---|---|---|---|
| 6,568,833 | B2 * | 5/2003 | Worgan .................. | B64D 47/06 |
| | | | | 174/16.3 |
| 8,591,081 | B2 * | 11/2013 | Inaba ........................ | F21K 9/00 |
| | | | | 362/460 |

(Continued)

FOREIGN PATENT DOCUMENTS

| | | |
|---|---|---|
| JP | 2011-028961 A | 2/2011 |
| JP | 2012-059673 A | 3/2012 |

(Continued)

*Primary Examiner* — Tsion Tumebo
(74) *Attorney, Agent, or Firm* — Renner, Otto, Boisselle & Sklar, LLP

(57) ABSTRACT

The light source unit includes: a semiconductor light emitting element; a lighting circuit configured to operate the semiconductor light emitting element; a first heat dissipation plate on which the semiconductor light emitting element is placed; a second heat dissipation plate on which the lighting circuit is placed; a wiring member electrically interconnecting the semiconductor light emitting element and the lighting circuit; and an interconnection member to which the first heat dissipation plate and the second heat dissipation plate are attached. The interconnection member is lower in thermal conductivity than the first heat dissipation plate and the second heat dissipation plate.

16 Claims, 7 Drawing Sheets

(51) Int. Cl.
    *F21S 45/49*   (2018.01)
    *F21S 45/47*   (2018.01)
    *F21Y 115/10*  (2016.01)

(56) References Cited

U.S. PATENT DOCUMENTS

| | | | | |
|---|---|---|---|---|
| 2010/0246204 A1* | 9/2010 | Inaba | F21S 48/1159 | 362/539 |
| 2010/0253223 A1* | 10/2010 | Inoue | F21S 48/1159 | 315/82 |
| 2012/0062117 A1 | 3/2012 | Tominaga et al. | | |
| 2013/0201707 A1 | 8/2013 | Suzuki et al. | | |
| 2013/0250602 A1* | 9/2013 | Tsukamoto | F21S 48/1109 | 362/547 |

FOREIGN PATENT DOCUMENTS

| | | |
|---|---|---|
| JP | 2012-074217 A | 4/2012 |
| JP | 2012-174539 A | 9/2012 |
| JP | 2015-065034 A | 4/2015 |

\* cited by examiner

LIGHT SOURCE UNIT, LIGHTING DEVICE, AND VEHICLE

CROSS-REFERENCE TO RELATED APPLICATIONS

The present application is based upon and claims the benefit of priorities of Japanese Patent Application No. 2015-135517, filed on Jul. 6, 2015, and Japanese Patent Application No. 2015-252222, filed on Dec. 24, 2015, the entire contents of which are incorporated herein by reference.

TECHNICAL FIELD

The present disclosure relates to light source units, lighting devices, and vehicles, and in particular to a light source unit, a lighting device, and a vehicle, including a light source constituted by a semiconductor light emitting element.

BACKGROUND ART

In the past, there has been proposed a vehicle light including a light emitting module (light source unit) having a light source constituted by a semiconductor light emitting element such as a light emitting diode (LED) (see Document 1 [JP 2012-74217 A]).

The light emitting module disclosed in Document 1 includes a supporting member which has an L-shape and is made of metal. The supporting member has an upper face where a semiconductor light emitting element package is mounted, and also has a side face where a lighting control circuit for operating the semiconductor light emitting element is mounted.

In the light emitting module disclosed in Document 1, the semiconductor light emitting element package and the lighting control circuit are attached to the supporting member made of metal. Therefore, heat produced by one of the semiconductor light emitting element package and the lighting control circuit may be likely to be transferred to the other of the semiconductor light emitting element package and the lighting control circuit, via the supporting member. This may result in insufficient dissipation of heat produced by the semiconductor light emitting element package and the lighting control circuit.

SUMMARY

An objective of the present disclosure would be to propose a light source unit, a lighting device, and a vehicle which are capable of improving heat dissipation efficiency.

The light source unit of one aspect according to the present disclosure includes: a semiconductor light emitting element; a lighting circuit configured to operate the semiconductor light emitting element; a first heat dissipation plate on which the semiconductor light emitting element is placed; a second heat dissipation plate on which the lighting circuit is placed; a wiring member electrically interconnecting the semiconductor light emitting element and the lighting circuit; and an interconnection member to which the first heat dissipation plate and the second heat dissipation plate are attached. The interconnection member is lower in thermal conductivity than the first heat dissipation plate and the second heat dissipation plate.

The lighting device of one aspect according to the present disclosure includes: the lighting unit of the above aspect; a case including an opening and being for accommodating the lighting unit; and a light-transmissive member attached to the case to cover the opening.

The vehicle of one aspect according to the present disclosure includes the lighting device of the above aspect, and a vehicle body to which the lighting device is attached.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Figure 1A:
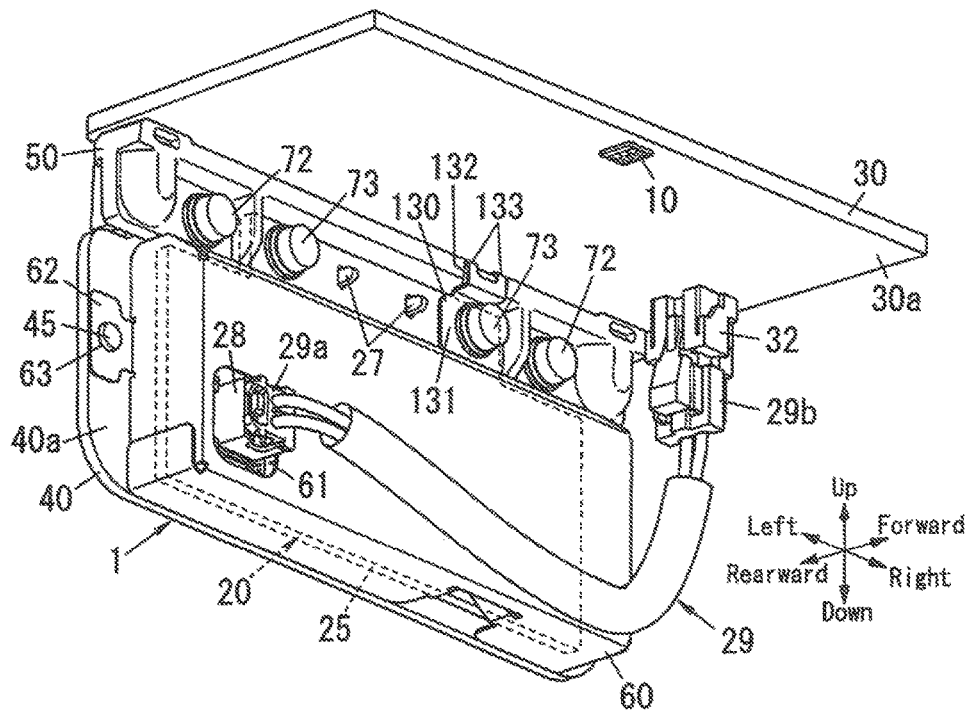
FIG. 1A is a front perspective view of a light source unit of one embodiment according to the present disclosure.

Hereinafter, the light source unit according to the present embodiment is described with reference to the drawings. The light source unit of the present embodiment is used for a fog lamp of a vehicle (e.g., automobiles and motorcycles). However, the light source unit is not limited to being used for a fog lamp, but may be used for a headlight or a backup light of a vehicle, or a lighting device other than vehicle lighting devices. The scope of the present disclosure is not limited to the following embodiment, and also the embodiment can be modified according to design or the like without departing from the scope of the present disclosure.

The light source unit 1 of the present embodiment is described with reference to FIG. 1 to FIG. 8.

The light source unit 1 of the present embodiment includes a semiconductor light emitting element (LED 10), a lighting circuit 20, a first heat dissipation plate 30, a second heat dissipation plate 40, a wiring member (a wiring harness 29), an interconnection member 50, and further includes a cover 60 and an electrically conductive member 130. In the following description of the light source unit 1, upward, downward, left, right, forward and rearward directions designated by arrows in FIG. 1A and FIG. 1B correspond to upward, downward, left, right, forward and rearward directions of the light source unit 1, respectively.

The light source unit 1 includes the semiconductor light emitting element constituted by a light emitting diode (LED) 10. The number of LEDs 10 may be one or more. When the light source unit 1 includes multiple LEDs 10, the multiple LEDs 10 may be connected in series and/or parallel. Note that, the semiconductor light emitting element is not limited to the LED 10 but may be an organic electro luminescent device (organic EL device).

Figure 4:
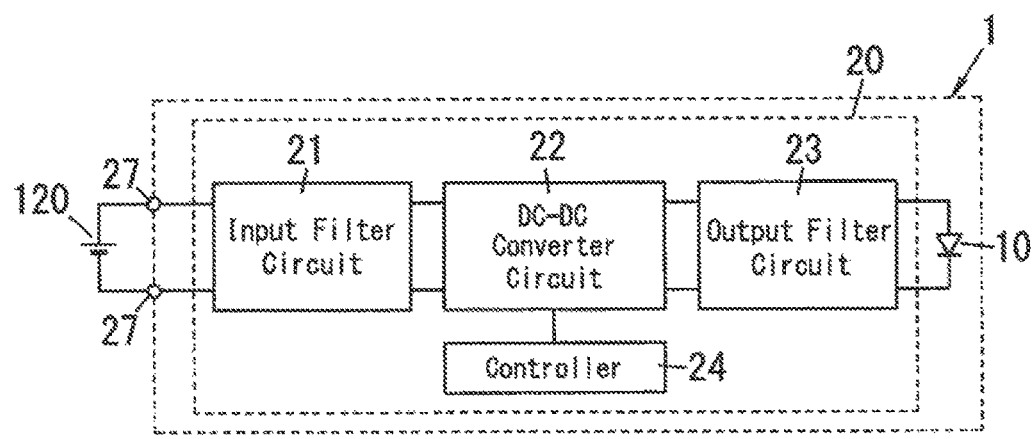
FIG. 4 is a block diagram of a lighting circuit of the light source unit of the above.

As shown in FIG. 4, the lighting circuit 20 includes an input filter circuit 21, a DC-DC converter circuit 22, an output filter circuit 23, and a control circuit 24.

The input filter circuit 21 is to be electrically connected to a DC power supply 120 which may be a battery of a vehicle, for example. The input filter circuit 21 may be a noise filter including one or more choke coils, for example. The input filter circuit 21 attenuates a high-frequency noise component transferred from the DC-DC converter circuit 22 to the DC power supply 120.

The DC-DC converter circuit 22 may be a step-up chopper circuit, for example. The DC-DC converter circuit 22 converts a power voltage inputted from the DC power supply 120 via the input filter circuit 21 into a constant DC voltage and outputs the same. Note that, the DC-DC converter circuit 22 is not limited to the step-up chopper circuit but may be a step-up and down chopper circuit or a step-down chopper circuit.

The output filter circuit 23 is to be electrically connected between the DC-DC converter circuit 22 and the LED 10. The output filter circuit 23 may be a noise filter including one or more common mode choke coils, for example. The output filter circuit 23 attenuates a high-frequency noise component possibly included in an output from the DC-DC converter circuit 22.

The control circuit 24 is configured to control a switching element of the DC-DC converter circuit 22. The control circuit 24 controls a duty cycle of the switching element to thereby regulate an output voltage of the DC-DC converter circuit 22. The control circuit 24 controls the duty cycle of the switching element so that a value of a current flowing through the LED 10 is equal to a desired current value.

In this lighting circuit 20, the DC-DC converter circuit 22 adjusts a magnitude of the DC voltage inputted from the DC power supply 120 through the input filter circuit 21. The output voltage from the DC-DC converter circuit 22 is applied across the LED 10 through the output filter circuit 23. A current depending on the output voltage from the DC-DC converter circuit 22 flows through the LED 10, and this leads to illumination of the LED 10.

Figure 2:
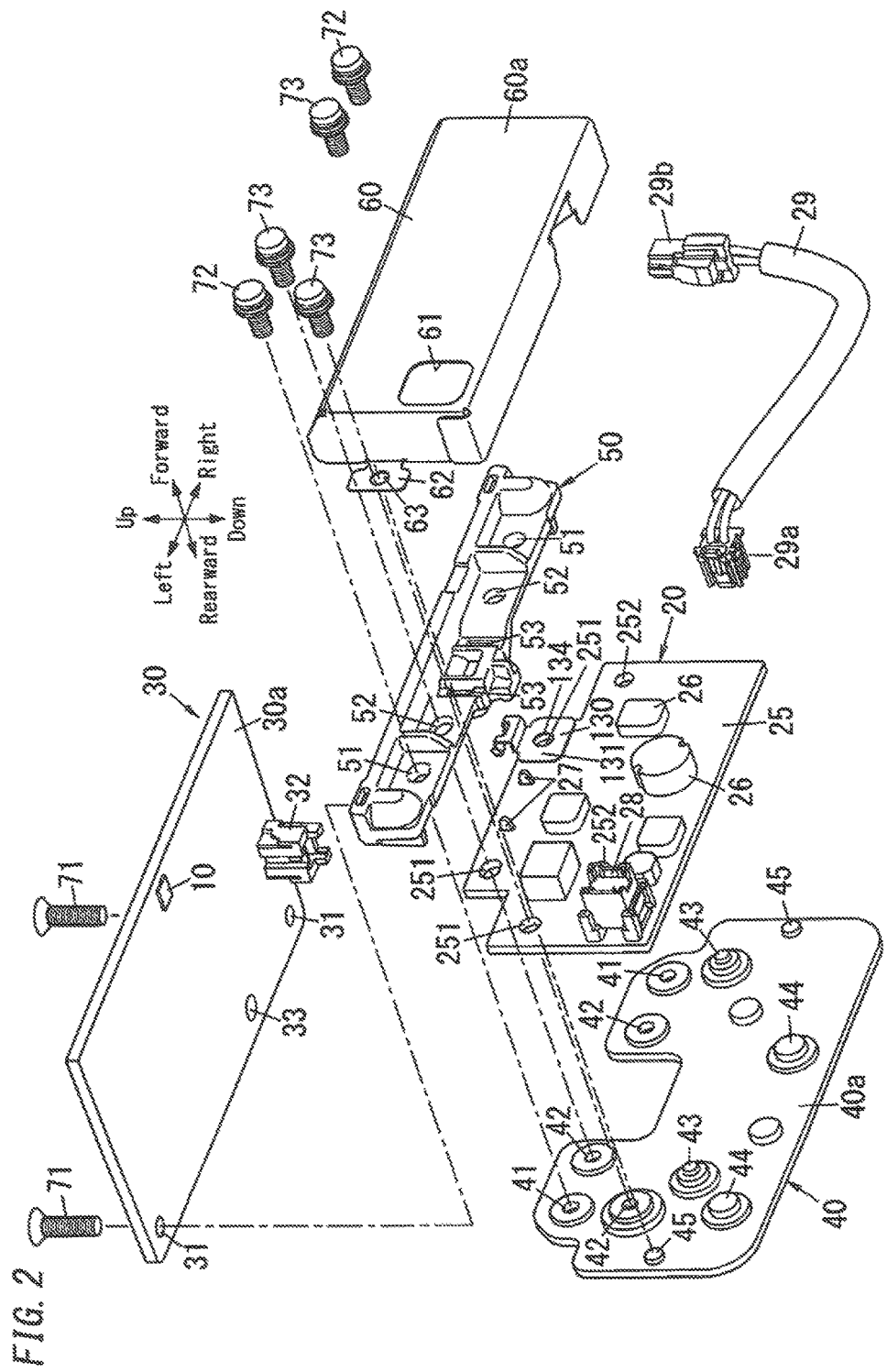
FIG. 2 is an exploded perspective view of the light source unit of the above.

The lighting circuit 20 includes a circuit board 25 such as a printed wiring board (see FIG. 2). There are electric components 26 mounted on the circuit board 25. The electric components 26 constitute the input filter circuit 21, the DC-DC converter circuit 22, the output filter circuit 23, and the control circuit 24. The second heat dissipation plate 40 has two faces (a first face 40*a* and a second face 40*b*) in a thickness direction thereof, and the circuit board 25 is attached to the first face (front face) 40*a* which is the closer to the first heat dissipation plate 30 of the two faces (see FIG. 1A). There is a cover 60 attached to the first face 40*a* of the second heat dissipation plate 40. The cover 60 has a box shape with an open rear face. When the cover 60 is attached to the second heat dissipation plate 40, the cover 60 covers the circuit board 25.

The circuit board 25 is attached with two insertion terminals 27 (second terminals) (see FIG. 2). The two insertion terminals 27 are male terminals, and are used for supply of power to the lighting circuit 20. The two insertion terminals 27 penetrate through the circuit board 25 in the thickness direction, and protrude rearward from the rear face of the circuit board 25. The insertion terminals 27 are to be removably connected to female connection terminals 111 (first terminals) provided to the power supply cable 110 extended from the DC power supply 120 (see FIG. 5). When the connection terminals 111 of the power supply cable 110 extending from the DC power supply 120 are connected to the insertion terminals 27 of the light source unit 1, the DC voltage is supplied from the DC power supply 120 to the lighting circuit 20. Note that, shapes of the first terminals and the second terminals are not limited to the shapes described in the present embodiment, but may be other shapes. For example, the second terminal may be a screw terminal to which a terminal (first terminal) provided to an end of the power supply cable 110 or the power supply cable 110 per se is to be screwed. Alternatively, the first terminal and the second terminal may be terminals of connectors to be removably connected to each other.

Further, there is a socket connector 28 provided to a front face of the circuit board 25 (see FIG. 1A). The socket connector 28 is to be removably connected to a plug connector 29*a* provided to a first end of a wiring harness 29. The socket connector 28 is electrically connected to output terminals of the output filter circuit 23. The socket connector 28 is exposed outside the cover 60 through a rectangular hole 61 provided to the cover 60.

The first heat dissipation plate 30 has a flat plate shape and is made of metal (e.g., an aluminum alloy).

The first heat dissipation plate 30 may be rectangular, for example. The first heat dissipation plate 30 has a lengthwise direction, a width direction and a thickness direction which correspond to the left and right direction, the forward and rearward direction, and the upward and downward direction of the light source unit 1, respectively. The first heat dissipation plate 30 is provided with through holes 31 at part overlapped with an upper face (the first attachment face 50*a*) of the interconnection member 50 in the upward and downward direction. Each through hole 31 receives a countersunk screw 71. The through hole 31 has an inner peripheral face inclined so that a diameter of the through hole 31 becomes gradually larger toward an upper end than at a lower end. Therefore, when the countersunk screw 71 is inserted in the through hole 31, a head of the countersunk screw 71 does not protrude upward from the upper face of the first heat dissipation plate 30.

There is an insulating film formed on a mounting face (a lower face in FIG. 1A) 30*a* which is closer to the second heat dissipation plate 40 of the two faces of the first heat dissipation plate 30 in the thickness direction. The LED 10 and a socket connector 32 are provided to a surface of the insulating film formed on the mounting face 30*a*. The socket connector 32 is to be removably connected to a plug connector 29*b* provided to a second end of the wiring harness 29. Further, circuit wiring (e.g., circuit wiring made of a metal film such as copper foil) electrically interconnecting the socket connector 32 and the LED 10 is formed on the surface of the insulating film formed on the mounting face 30*a*. In this regard, when the plug connector 29*a* of the wiring harness 29 is connected to the socket connector 28 and the plug connector 29*b* is connected to the socket connector 32, the LED 10 is electrically connected to the output terminals of the output filter circuit 23 through the wiring harness 29.

Note that, the wiring member electrically interconnecting the LED 10 and the lighting circuit 20 is not limited to the wiring harness 29. For example, the LED 10 and the lighting circuit 20 may be electrically interconnected by an electrically conductive plate. Alternatively, the LED 10 and the lighting circuit 20 may be electrically interconnected by an electrically conductive plate integrally provided to a molded product constituting the interconnection member 50.

The first heat dissipation plate 30 is provided with a through hole 33 (first recess) for receiving part of the electrically conductive member 130. The through hole 33 may be formed by subjecting the first heat dissipation plate 30 to press work, for example. Therefore, the insulating film is not present on an inner peripheral face of the through hole 33, and metal part of the first heat dissipation plate 30 is exposed. Note that, in the present embodiment, the first recess is the through hole 33. The first recess is not required to penetrate through the first heat dissipation plate 30, and therefore the first recess may be a hole not penetrating through the first heat dissipation plate 30.

The second heat dissipation plate 40 has a flat plate shape and is made of metal (e.g., an aluminum alloy). The second heat dissipation plate 40 is rectangular, for example. The second heat dissipation plate 40 has a lengthwise direction, a width direction and a thickness direction which correspond to the left and right direction, the upward and downward direction, and the forward and rearward direction of the light source unit 1, respectively. The second heat dissipation plate 40 has a maximum width in the left and right direction which is almost equal to a maximum width of a rear end of the first heat dissipation plate 30 in the left and right direction.

The second heat dissipation plate 40 has two faces (a first face 40a and a second face 40b) in a thickness direction. The circuit board 25 of the lighting circuit 20 is fixed with screws 73 to the first face (a front face in FIG. 1A) 40a which is the closer to the first heat dissipation plate 30 of the two faces. The second heat dissipation plate 40 is provided with: two screw holes 41 for receiving two screws 72 for fixing the interconnection member 50; and three screw holes 42 for receiving the three screws 73 for fixing the circuit board 25. The two screw holes 41 and two of the three screw holes 42 are provided to part of the second heat dissipation plate 40 which is overlapped with a rear face (a second attachment face 50b) of the interconnection member 50 in the forward and rearward direction.

Further, the second heat dissipation plate 40 is formed at the front face 40a with: two protrusions 43 for positioning the circuit board 25; two protrusions 44 to be in contact with the rear face of the circuit board 25; and two protrusion 45 for positioning the cover 60, by press work, for example. The circuit board 25 is provided with three through holes 251 individually facing the three screw holes 42. Further, the circuit board 25 is provided with two through holes 252 individually facing the two protrusions 43.

The circuit board 25 is positioned on the front side of the second heat dissipation plate 40 with the two protrusions 43 inserted into the two through holes 252, and is attached to the second heat dissipation plate 40 by fitting the three screws 73 inserted into the three through holes 251 into the three screw holes 42. When the circuit board 25 is screwed to the second heat dissipation plate 40, the protrusions 44 are in contact with the rear face of the circuit board 25 and therefore the circuit board 25 is stabilized.

The interconnection member 50 is made of a material which is lower in thermal conductivity than respective materials (e.g., metal materials such as aluminum alloys) of the first heat dissipation plate 30 and the second heat dissipation plate 40. In the present embodiment, the interconnection member 50 is made of synthetic resin such as poly butylene terephthalate (PBT). However, the material of the interconnection member 50 is not limited to PBT but may be synthetic resin other than PBT. The interconnection member 50 may be made of an electrically insulating material.

The interconnection member 50 is a polyhedral object, and may be formed to have an inverted L-shape cross section in a plane perpendicular to the left and right direction. The rear end of the first heat dissipation plate 30 is fastened to the first attachment face 50a which is the upper face of the interconnection member 50, with the countersunk screws 71. The upper part of the second heat dissipation plate 40 is fastened to the second attachment face 50b which is the rear face of the interconnection member 50 with the screws 72.

Figure 3:
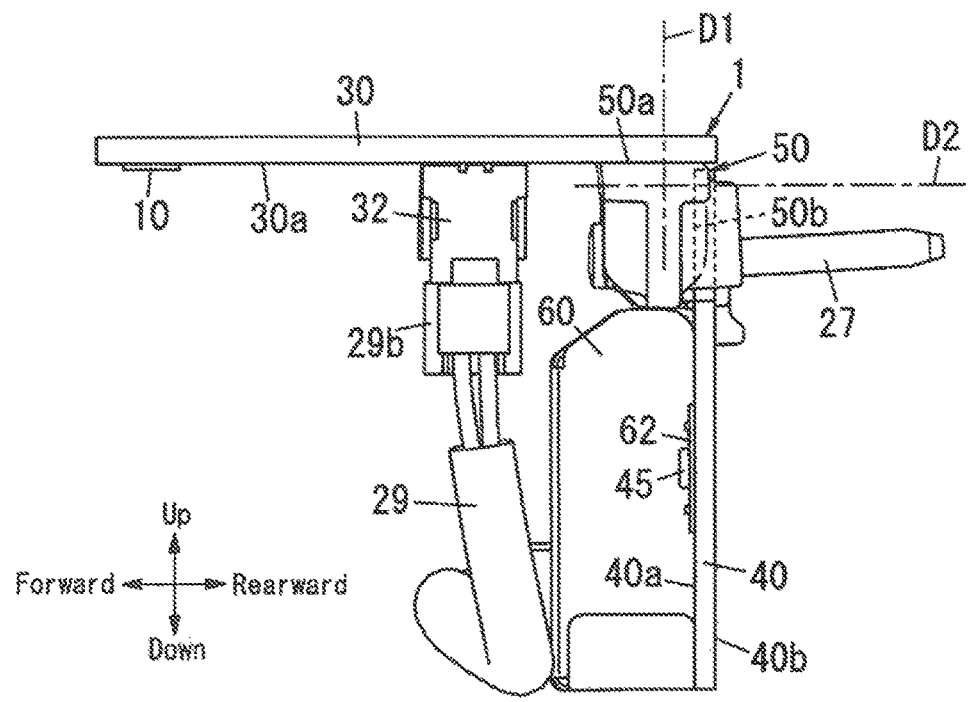
FIG. 3 is a right side view of the light source unit of the above.

The first attachment face 50a of the interconnection member 50 to be attached to the first heat dissipation plate 30 and the second attachment face 50b of the interconnection member 50 to be attached to the second heat dissipation plate 40 are in a positional relation in which different imaginary planes respectively including the first attachment face 50a and the second attachment face 50b cross each other (as shown in FIG. 3). The positional relation in which the different imaginary planes respectively including the first attachment face 50a and the second attachment face 50b cross each other can be interpreted as a relation in which a normal direction (a direction parallel to a straight line D1 in FIG. 3) of the first attachment face 50a and a normal direction (a direction parallel to a straight line D2 in FIG. 3) of the second attachment face 50b cross each other at any angle in a plane perpendicular to one face of the first heat dissipation plate 30 in its thickness direction and one face of the second heat dissipation plate 40 in its thickness direction. Note that, in the present embodiment, the normal direction of the first attachment face 50a and the normal direction of the second attachment face 50b are perpendicular to each other. However, an angle between the normal direction of the first attachment face 50a and the normal direction of the second attachment face 50b may not be required to be a right angle in a strict sense, and may be allowed to be an angle generally considered a right angle.

The interconnection member 50 is provided with two through holes 51 individually facing the two screw holes 41 of the second heat dissipation plate 40. Further, the interconnection member 50 is provided with two through holes 52 individually facing the two screw holes 42 provided to the part of the second heat dissipation plate 40 overlapped with the interconnection member 50 in the forward and rearward direction. Additionally, as described above, the two insertion terminals 27 are provided to the part of the rear face of the circuit board 25 overlapped with the interconnection member 50 in the forward and rearward direction. The interconnection member 50 is provided with two slits (second recesses) 53 for individually receiving the two insertion terminals 27. In the light source unit 1, the two slits 53 receive parts of the corresponding insertion terminals 27, and thereby the parts of the insertion terminal 27 are supported by the interconnection member 50.

The cover 60 is made of metal. The cover 60 is formed into a box shape with an open rear end. The cover 60 is provided at rear ends of left and right side plates with attachment piece 62 protruding outward. The attachment piece 62 on left and right sides are provided with through holes 63 for receiving the protrusions 45.

Figure 6:
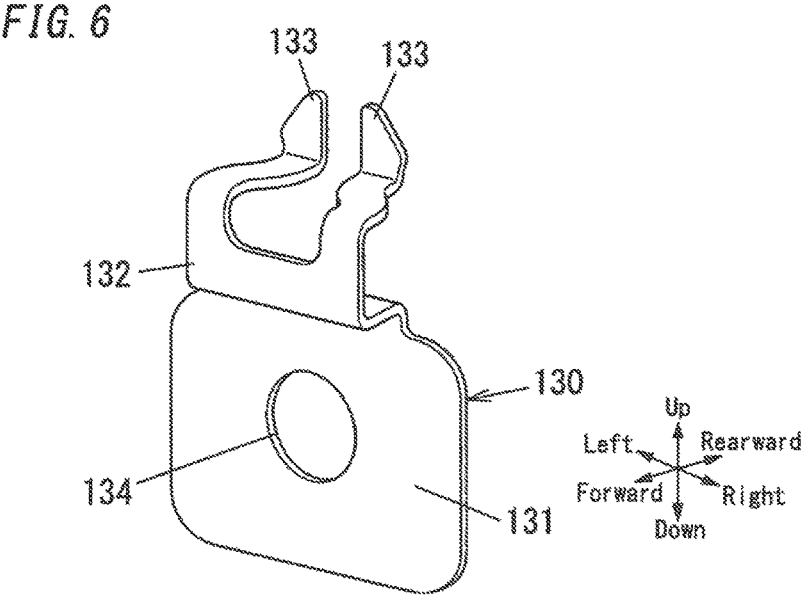
FIG. 6 is a perspective view of an electrically conductive member of the light source unit of the above.

The electrically conductive member 130 is made of an electrically conductive material (e.g., metal). As shown in FIG. 6, the electrically conductive member 130 includes a fixed piece 131 and a protruding piece 132.

The fixed piece 131 has a rectangular plate shape. The fixed piece 131 is provided with a through hole 134. The fixed piece 131 is positioned on the front face of the circuit board 25 so that the through hole 134 is overlapped with the through hole 251 provided to right and upper part of the circuit board 25 (see FIG. 2).

When viewed in the left and right direction, the protruding piece 132 has an almost U-shape. The protruding piece 132 is connected at a first end to an upper side of the fixed piece 131, and the other end of the protruding piece 132 is branched into two parts provided at their ends with contact pieces 133 protrude upward.

The light source unit 1 can be assembled as follows.

A worker overlaps the upper part of the second heat dissipation plate 40 with the second attachment face 50b of the interconnection member 50, and then fits the screws 72 into the screw holes 41 through the through holes 51, thereby screwing the second heat dissipation plate 40 to the interconnection member 50. Next, the worker places the circuit board 25 on the front face 40a of the second heat dissipation plate 40, and inserts the protrusions 43 into the through holes 252, thereby positioning the circuit board 25 relative to the second heat dissipation plate 40. The worker inserts the screws 73 into the three through holes 251 of the circuit board 25 from the front side, and fits these screws 73 into the corresponding screw holes 42, thereby attaching the circuit board 25 to the second heat dissipation plate 40. At this stage, the fixed piece 131 is placed on the front face of the circuit board 25 so that the through hole 134 is overlapped with the through hole 251, and the electrically conductive member 130 is fixed with the screws 73 to the second heat dissipation plate 40 together with the circuit board 25. Accordingly, the electrically conductive member 130 and the second heat dissipation plate 40 are electrically connected via the screws 72. Further, the protruding piece 132 is positioned to avoid contact with the interconnection member 50, and the contact piece 133 is placed on the upper face (the first attachment face 50a) of the interconnection member 50.

Thereafter, the worker places the cover 60 on the front face 40a of the second heat dissipation plate 40 so as to cover the circuit board 25, and crushes the protrusions 45 inserted into the through holes 63 of the attachment pieces 62, thereby fixing the cover 60 to the second heat dissipation plate 40.

Figure 1B:
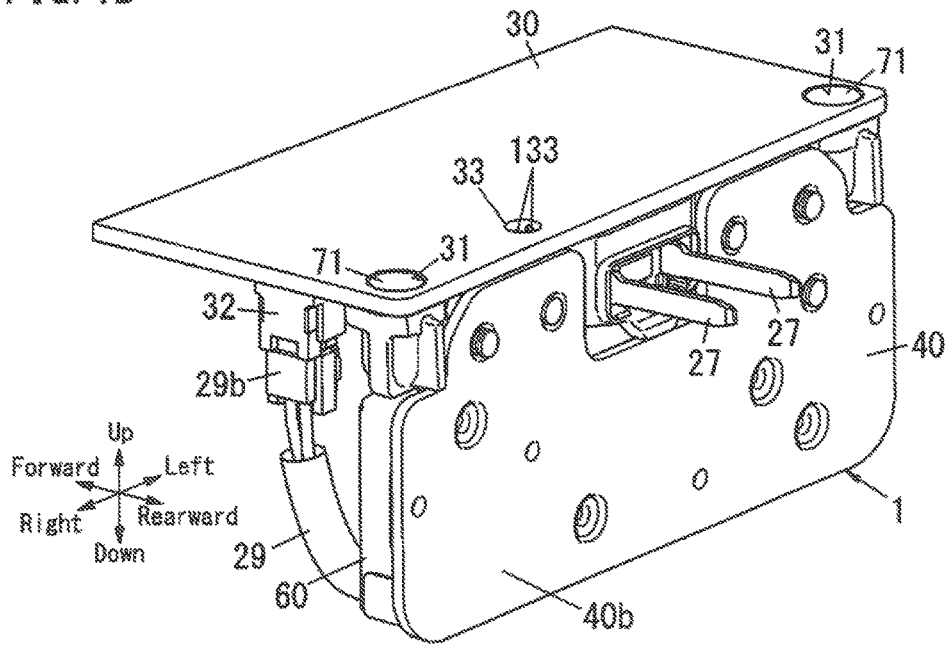
FIG. 1B is a rear perspective view of the light source unit of the above.
Figure 7:
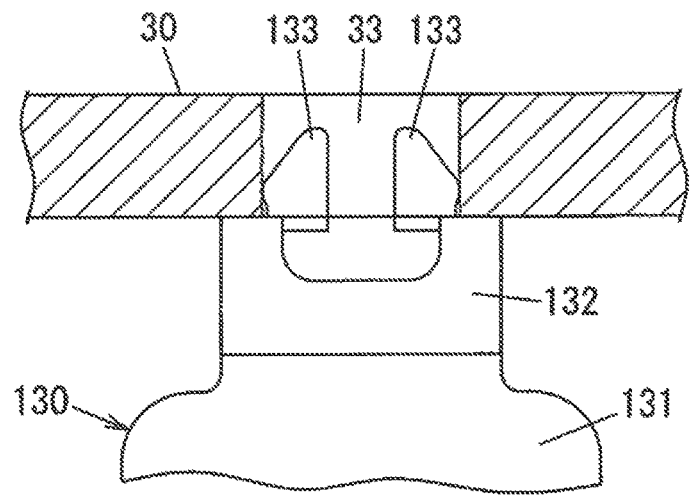
FIG. 7 is a section illustrating a junctional region of the electrically conductive member and a first heat dissipation plate of the light source unit of the above.
Figure 8:
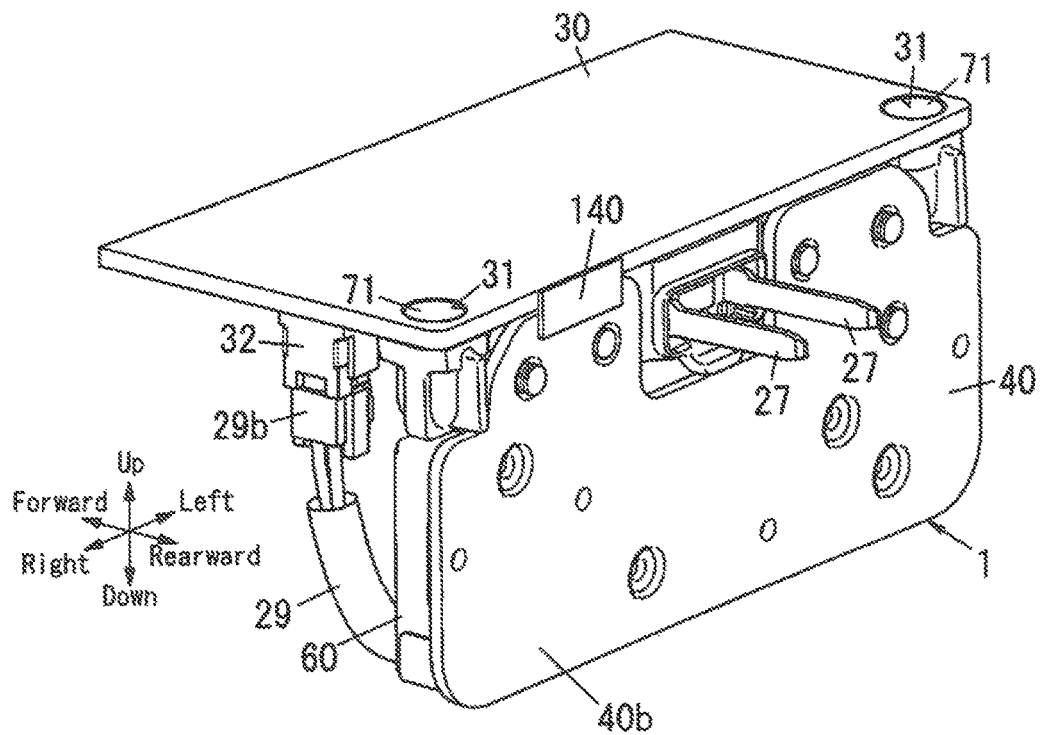
FIG. 8 is a rear perspective view of another example of the light source unit of the above.

Next, while overlapping the rear part of the first heat dissipation plate 30 with the first attachment face 50a of the interconnection member 50, the worker fits the countersunk screw 71 into screw holes of the interconnection member 50 through the through holes 31, thereby screwing the first heat dissipation plate 30 to the interconnection member 50. In this regard, as shown in FIG. 1B and FIG. 7, the pair of contact pieces 133 of the electrically conductive member 130 is inserted into the through hole 33 of the first heat dissipation plate 30, and therefore the pair of contact pieces 133 in contact with a surface of the through hole 33. The insulating film is formed on the lower face 30a of the first heat dissipation plate 30. However, the first heat dissipation plate 30 is subjected to a hole forming process to form the through hole 33, and therefore the surface of the through hole 33 is not covered with the insulating film. Thus, the contact piece 133 and the first heat dissipation plate 30 are electrically connected to each other. Consequently, the first heat dissipation plate 30 and the second heat dissipation plate 40 are electrically interconnected through the electrically conductive member 130. The contact piece 133 has a spring property, and therefore a sufficient contact pressure between the contact piece 133 and the first heat dissipation plate 30 can be ensured.

Thereafter, the worker connects the plug connector 29a of the wiring harness 29 to the socket connector 28, and further connects the plug connector 29b to the socket connector 32. Thereby, assembly of the light source unit 1 is completed.

When the assembly of the light source unit 1 is completed, the first heat dissipation plate 30 and the second heat dissipation plate 40 are electrically interconnected through the electrically conductive member 130. Note that, a region of the electrically conductive member 130 thermally coupled with the first heat dissipation plate 30 is the contact piece 133. Further, a region of the electrically conductive member 130 thermally coupled with the second heat dissipation plate 40 is regions of the fixed piece 131 in contact with heads of the screws 73. Further, a region of the interconnection member 50 in contact with the first heat dissipation plate 30 is the first attachment face 50a, and a region of the interconnection member 50 in contact with the second heat dissipation plate 40 is the second attachment face 50b. Therefore, areas of regions, thermally coupled with the first heat dissipation plate 30 and the second heat dissipation plate 40, of the electrically conductive member 130 are smaller than areas of regions, thermally coupled with the first heat dissipation plate 30 and the second heat dissipation plate 40, of the interconnection member 50, respectively. Therefore, even if the material of the electrically conductive member 130 is higher in thermal conductivity than the material of the interconnection member 50, an amount of heat transferred between the first heat dissipation plate 30 and the second heat dissipation plate 40 through the electrically conductive member 130 can be made to be smaller than an amount of heat transferred between the first heat dissipation plate 30 and the second heat dissipation plate 40 through the interconnection member 50. Therefore, even if the first heat dissipation plate 30 and the second heat dissipation plate 40 are electrically interconnected through the electrically conductive member 130, transfer of heat between the first heat dissipation plate 30 and the second heat dissipation plate 40 can be suppressed.

Note that, in the light source unit 1, the electrically conductive member 130 is attached to the second heat dissipation plate 40, and the contact piece 133 is in contact with the first heat dissipation plate 30. Alternatively, the electrically conductive member 130 may be attached to the first heat dissipation plate 30, and the contact piece 133 may be in contact with the second heat dissipation plate 40.

Further, the electrically conductive member 130 is not limited to having the above configuration, and can be modified providing that the electrically conductive member 130 can electrically interconnect the first heat dissipation plate 30 and the second heat dissipation plate 40 at a low resistance. For example, one end of the electrically conductive member 130 may be fixed to the side face of the first heat dissipation plate 30 by welding, screwing, or the like, and the other end of the electrically conductive member 130 may be fixed to the side face of the second heat dissipation plate 40 with welding, screwing, or the like. In this case, the first heat dissipation plate 30 and the second heat dissipation plate 40 are electrically interconnected through the electrically conductive member 130. Further, as another example of the light source unit 1 shown in FIG. 8, an electrically conductive tape 140 can be used instead of the electrically conductive member 130, and in this example, the electrically conductive tape 140 may be attached to the first heat dissipation plate 30 and the second heat dissipation plate 40. Further, in another example of the light source unit 1, an electric cable can be used instead of the electrically conductive member 130, and in this example, the electric cable has one end screwed to the first heat dissipation plate 30, and the other end screwed to the second heat dissipation plate 40.

As described above, the light source unit 1 of the present embodiment includes the semiconductor light emitting element (the LED 10), the lighting circuit 20, the first heat dissipation plate 30, the second heat dissipation plate 40, the wiring member (the wiring harness 29), and the interconnection member 50. The lighting circuit 20 is configured to operate the semiconductor light emitting element. The semiconductor light emitting element is placed on the first heat dissipation plate 30. The lighting circuit 20 is placed on the second heat dissipation plate 40. The wiring member electrically interconnects the semiconductor light emitting element and the lighting circuit 20. The first heat dissipation plate 30 and the second heat dissipation plate 40 are attached to the interconnection member 50. The interconnection member 50 is lower in thermal conductivity than the first heat dissipation plate 30 and the second heat dissipation plate 40.

Accordingly, in contrast to a case where the first heat dissipation plate 30 and the second heat dissipation plate 40 are connected integrally, transfer of heat between the first heat dissipation plate 30 and the second heat dissipation plate 40 can be suppressed. Therefore, it is possible to suppress transfer of heat produced by one of the semiconductor light emitting element and the lighting circuit 20 to the other. Consequently, heat dissipation of the semiconductor light emitting element and the lighting circuit 20 can be realized individually and appropriately. As a result, the heat dissipation efficiency of the light source unit 1 can be improved. Further, the first heat dissipation plate 30 and the second heat dissipation plate 40 are individually attached to the interconnection member 50, and therefore can be treated as a single part, and therefore it is possible to facilitate conveyance and assembly of the light source unit 1.

Further, in the light source unit 1 of the present embodiment, the interconnection member 50 has the first attachment face 50a and the second attachment face 50b which are in a positional relation in which an imaginary plane including the first attachment face 50a crosses an imaginary plane including the second attachment face 50b. The first heat dissipation plate 30 is attached to the first attachment face 50a, and the second heat dissipation plate 40 is attached to the second attachment face 50b.

Accordingly, in contrast to a case where the first heat dissipation plate 30 and the second heat dissipation plate 40 are attached to the interconnection member 50 so as to be parallel to each other, the light source unit 1 can be downsized.

Further, the light source unit 1 of the present embodiment includes the electrically conductive member 130 electrically interconnecting the first heat dissipation plate 30 and the second heat dissipation plate 40.

When one of the first heat dissipation plate 30 and the second heat dissipation plate 40 is earthed, the other of the first heat dissipation plate 30 and the second heat dissipation plate 40 is earthed, too. In this case, both the first heat dissipation plate 30 and the second heat dissipation plate 40 can be earthed, and therefore possible noises emitted from the lighting circuit 20 can be reduced.

Further, in the light source unit 1 of the present embodiment, the electrically conductive member 130 is formed so that an amount of heat transferred between the first heat dissipation plate 30 and the second heat dissipation plate 40 through the electrically conductive member 130 is smaller than an amount of heat transferred between the first heat dissipation plate 30 and the second heat dissipation plate 40 through the interconnection member 50.

Accordingly, even if the first heat dissipation plate 30 and the second heat dissipation plate 40 are electrically interconnected through the electrically conductive member 130, it is possible to suppress transfer of heat between the first heat dissipation plate 30 and the second heat dissipation plate 40.

Further, in the light source unit 1 of the present embodiment, areas of regions, thermally coupled with the first heat dissipation plate 30 and the second heat dissipation plate 40, of the electrically conductive member 130 are smaller than areas of regions, thermally coupled with the first heat dissipation plate 30 and the second heat dissipation plate 40, of the interconnection member 50, respectively.

Accordingly, it is possible to reduce an amount of heat transferred between the first heat dissipation plate 30 and the second heat dissipation plate 40 through the electrically conductive member 130.

Further, in the light source unit 1 of the present embodiment, the electrically conductive member 130 includes the contact piece 133 which is flexible. The contact piece 133 is in contact with a surface of one of the first heat dissipation plate 30 and the second heat dissipation plate 40, and the electrically conductive member 130 is attached to the other of the first heat dissipation plate 30 and the second heat dissipation plate 40.

Accordingly, when the first heat dissipation plate 30 and the second heat dissipation plate 40 are attached to the interconnection member 50, the contact piece 133 is in contact with a surface of one of the first heat dissipation plate 30 and the second heat dissipation plate 40. Therefore, there is no need to attach the electrically conductive member 130 to both the first heat dissipation plate 30 and the second heat dissipation plate 40, and therefore it is possible to facilitate attachment of the electrically conductive member 130.

Further, in the light source unit 1 of the present embodiment, a heat dissipation plate which is one of the first heat dissipation plate 30 and the second heat dissipation plate 40 and is in contact with the contact piece 133 includes the first recess (the through hole 33) for receiving the contact piece 133.

Accordingly, the contact piece 133 inserted into the first recess is made to be in contact with the surface (i.e., an inner face) of the first recess, and therefore the first heat dissipation plate 30 and the second heat dissipation plate 40 are electrically interconnected through the electrically conductive member 130. Note that, the first recess may be a through hole penetrating through the heat dissipation plate, or a blind hole (a hole not penetrating through the heat dissipation plate) formed by partially setting back the heat dissipation plate.

Further, the light source unit 1 of the present embodiment includes the electrically conducting member (the insertion terminal 27) for energizing the lighting circuit 20. The interconnection member 50 includes the second recess (the slit 53) for receiving part of the electrically conducting member.

Accordingly, the interconnection member 50 to which the first heat dissipation plate 30 and the second heat dissipation plate 40 can be made to support the electrically conducting member (the insertion terminal 27).

Further, in the light source unit 1 of the present embodiment, the electrically conducting member includes the second terminal (the insertion terminals 27 of a male connector)

electrically connected to the first terminal (the connection terminals 111 of a female connector) of the power supply cable 110.

Accordingly, it is possible to facilitate electrically connecting the first terminal of the power supply cable 110 to the second terminal of the electrically conducting member.

Next, a lighting device 300 including the light source unit 1 of the present embodiment is described with reference to FIG. 5 and FIG. 9. Note that, in the description of the lighting device 300, the upward and downward direction, the left and right direction, and the forward and rearward direction denoted by arrows in FIG. 5 and FIG. 9 correspond to the upward and downward direction, the left and right direction, and the forward and rearward direction of the lighting device 300, respectively.

The lighting device 300 may be a fog lamp to be mounted on a vehicle body 101 of a vehicle (e.g., an automobile and motorcycle), for example.

The lighting device 300 includes the light source unit 1 of the present embodiment, a case 301, and a cover 303 (light-transmissive member). In this regard, the light-transmissive member is a member with light-transmissive properties, and the light-transmissive member may be a transparent member or a translucent member.

The case 301 is a molded product of synthetic resin such as PBT, for example. The case 301 has a box shape with a front face including an opening 302. The case 301 accommodates the light source unit 1. The light source unit 1 is accommodated in the case 301 so that the second face 40*b* of the second heat dissipation plate 40 faces a rear wall of the case 301 and the first heat dissipation plate 30 is in contact with an upper side wall of the case 301.

The first heat dissipation plate 30 is placed inside the case 301 so as to be closer to the opening 302 than the second heat dissipation plate 40 is, and be also close to one end side (e.g., an upper side) in a direction crossing the forward and rearward direction. Alternatively, the first heat dissipation plate 30 may be placed to be close to a lower side, a left side, or a right side. The first heat dissipation plate 30 is in contact with the case 301. Therefore, the first heat dissipation plate 30 is electrically connected to a vehicle body 101 if the case 301 is electrically connected to the vehicle body 101.

The case 301 is provided at the rear wall with a through hole 304 for exposing the insertion terminals 27 outside. The through hole 304 is surrounded by a surrounding wall 305 in a hollow cylindrical or prism shape. The connection terminals 111 of the female connector are provided to an end of the power supply cable 110 extending from the DC power supply 120, and a housing 112 in a hollow cylindrical or prism shape is attached to the end so as to surround side of the connection terminals 111. When the surrounding wall 305 is inserted into the housing 112, the connection terminals 111 of the female connector are connected to the insertion terminals 27 of the male connector, and thus the DC power supply 120 is electrically connected to the lighting circuit 20. Further, when the surrounding wall 305 is inserted into the housing 112, a protrusion 306 provided to an external side of the surrounding wall 305 is fitted into a recess provided to an internal side of the housing 112, and thereby connection between the housing 112 and the surrounding wall 305 can be kept.

The case 301 is attached to the vehicle body 101 so as to be allowed to swing about an axle provided to an upper side of the rear part in a predetermined range of angles. A direction of illumination light can be adjusted by setting a direction of the case 301 to a direction corresponding to a desired angle in the predetermined range of angles. The insertion terminals 27 for energizing the lighting circuit 20 protrude rearward from the interconnection member 50, and the light source unit 1 is accommodated in the case 301 so that the interconnection member 50 is positioned on the upper side. In summary, the insertion terminal 27 is in a position close to a center of swing of the case 301. This may lead to a decrease in an amount of movement of the insertion terminal 27 caused by swing of the case 301 for adjusting the direction of the illumination light.

The cover 303 is made of light-transmissive synthetic resin (e.g., polycarbonate) or glass. The cover 303 is attached to the case 301 to cover the opening 302 (see FIG. 5 and FIG. 9). The cover 303 is light-transmissive, and therefore rays of light from the light source unit 1 are allowed to emerge outside through the cover 303. Note that, it is sufficient that the cover 303 is light-transmissive, which means that the cover 303 may be transparent or translucent.

The LED 10 is attached to the first heat dissipation plate 30 so as to emit light downward. In view of this, there is a reflective member 80 attached to the light source unit 1 for reflecting forward, light emitted from the LED 10. The reflective member 80 may be a molded product of synthetic resin, for example. The reflective member 80 includes a fixed part 81 and a reflective part 82, the fixed part 81 being fixed to the mounting face 30*a* of the first heat dissipation plate 30.

Figure 5:
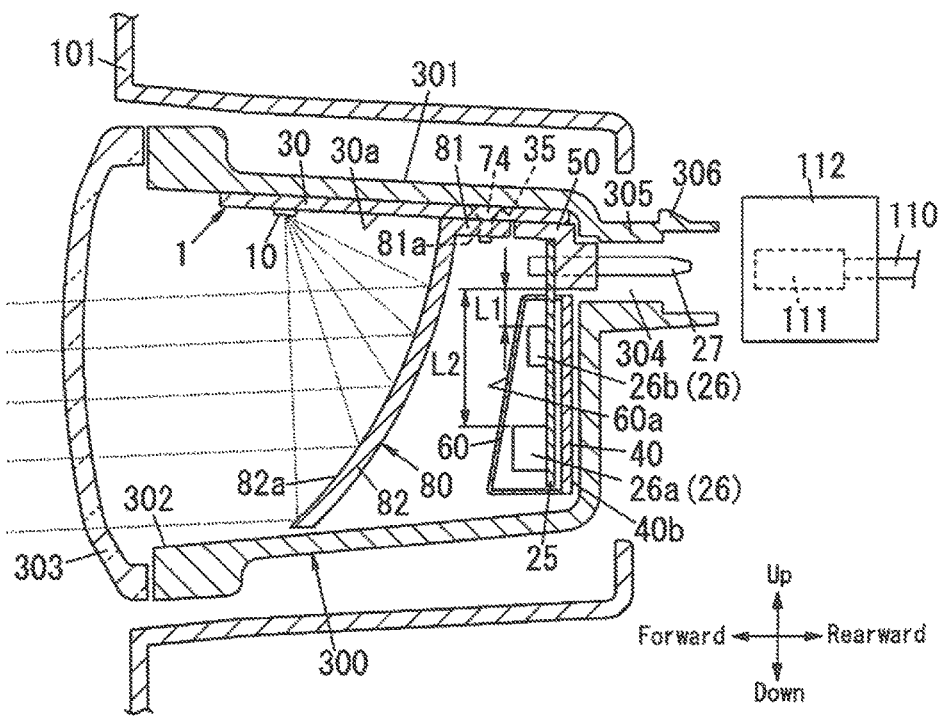
FIG. 5 is a section of a lighting device including the light source unit of the above.

The fixed part 81 can be fastened to the first heat dissipation plate 30 by, for example, fitting a screw 74 inserted into a through hole 35 of the first heat dissipation plate 30 from above, into a screw hole 81*a* of the fixed part 81 (see FIG. 5).

The reflective part 82 protrudes from a front end of the fixed part 81 in a forward and downward direction. A sectional shape perpendicular to the left and right direction of the reflective part 82 is such a sectional shape that a distance from the first heat dissipation plate 30 becomes gradually greater toward a front end of the reflective part 82 than at a rear end of the reflective part 82. The reflective part 82 has two faces in a thickness direction thereof, and one of the two faces which is closer to the LED 10 serves as a reflective face 82*a* for reflecting light of the LED 10. The reflective face 82*a* includes a paraboloidal surface with a focal point at a position of the LED 10. Therefore, light emitted from the LED 10 is reflected by the reflective face 82*a*, and thus travels forward. Note that, to improve reflectivity, the reflective face 82*a* may be plated with silver, for example.

In the light source unit 1 shown in FIG. 5, a front face 60*a* of the cover 60 is inclined relative to the front face of the second heat dissipation plate 40 (the circuit board 25) so that lower part of the cover 60 protrudes more forward. The electric components 26 constituting the lighting circuit 20 include a tall component 26*a* being relatively tall, and a short component 26*b* being relatively short. The tall component 26*a* may be a choke coil, a common mode choke coil, or the like. The short component 26*b* may be a resistor, a capacitor, or the like. In the light source unit 1, the multiple electric components 26 constituting the lighting circuit 20 are arranged on the circuit board 25 (the second heat dissipation plate 40) so that a distance L2 of the tall component 26*a* from the interconnection member 50 is longer than a distance L1 of the short component 26*b* from the interconnection member 50. Hence, the front face 60*a* of the cover 60 can be made to be inclined relative to the front face of the second heat dissipation plate 40 so that lower part of the cover 60 protrudes more forward. This may lead to suppression of mechanical interference between the reflective member 80 and the cover 60.

Figure 10:
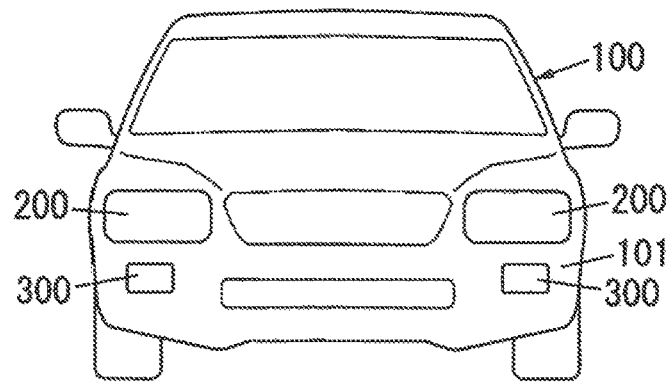
FIG. 10 is a front view of a vehicle including the lighting device.

FIG. 10 is a front view of a vehicle 100 including the lighting devices 300. The vehicle 100 includes the lighting device 300, and the vehicle body 101 to which the lighting device 300 is attached. In more detail, in the vehicle 100, two lighting devices 300 serving as fog lamps are attached to respective left and right side of front part of the vehicle body 101. Note that, there are two lighting devices 200 attached to the respective left and right side of front part of the vehicle body 101 so as to be positioned over the two lighting devices 300. The two lighting devices 200 are used as headlights.

As described above, the lighting device 300 includes the light source unit 1, the case 301 including the opening 302 and accommodating the light source unit 1, and the light-transmissive member (the cover 303) attached to the case 301 to cover the opening 302. The lighting device 300 includes the light source unit 1, and hence heat produced by the semiconductor light emitting element (the LED 10) and heat produced by the lighting circuit 20 are dissipated individually and properly. This may lead to improvement of the heat dissipation efficiency.

Further, the vehicle 100 includes the lighting device 300 and the vehicle body 101 to which the lighting device 300 is attached. The lighting device 300 includes the light source unit 1, and hence heat produced by the semiconductor light emitting element (the LED 10) and heat produced by the lighting circuit 20 are dissipated individually and properly. This may lead to improvement of the heat dissipation efficiency.

Further, in the lighting device 300, the opening 302 may be in a front side of the case 301 and the first heat dissipation plate 30 and the second heat dissipation plate 40 may be placed as follows. The second heat dissipation plate 40 has the first face 40*a* and the second face 40*b* in the thickness direction of the second heat dissipation plate 40 (see FIG. 1A and FIG. 1B). The second face 40*b* of the second heat dissipation plate 40 is placed opposite the rear side of the case 301 inside the case 301. The first heat dissipation plate 30 is placed inside the case 301 so as to be closer to the opening 302 than the second heat dissipation plate 40. The lighting circuit 20 (the circuit board 25) is placed on the first face 40*a* of the second heat dissipation plate 40. According to this arrangement, the light source unit 1 becomes compact and can be accommodated in the case 301 to occupy only a relatively small space of the inside of the case 301.

Further, the lighting device 300 further includes the reflective member 80. The semiconductor light emitting element (the LED 10) is placed on a face (the mounting face 30*a*) which is the closer one to the second heat dissipation plate 40, of two faces 30*a* and 30*b* in a thickness direction of the first heat dissipation plate 30. The reflective member 80 includes the reflective part 82 and is placed inside the case 301 so as to be closer to the opening 302 than the second heat dissipation plate 40 is, with the reflective part 82 being opposite the semiconductor light emitting element. The reflective part 82 has the reflective face 82*a* which becomes gradually greater in a distance from the first heat dissipation plate 30 toward the front end than at the rear end. The lighting circuit 20 (the circuit board 25) is placed between the reflective part 82 of the reflective member 80 and the second heat dissipation plate 40.

Accordingly, the lighting circuit 20 can be accommodated by use of a space formed between the reflective member 80 and the second heat dissipation plate 40, and therefore it is possible to downsize the lighting device 300.

Further, in the lighting device 300 of the present embodiment, the multiple electric components 26 constituting the lighting circuit 20 include a relatively tall electric component (the tall component 26*a*), and a relatively short electric component (the short component 26*b*). The multiple electric components 26 are arranged on the circuit board 25 (the second heat dissipation plate 40) so that the distance L2 of the tall component 26*a* from the interconnection member 50 is longer than the distance L1 of the short component 26*b* from the interconnection member 50.

Therefore, it is possible to suppress mechanical interference between the reflective member 80 and the electric components 26.

Further, in the lighting device 300 of the present embodiment, the reflective member 80 further includes the fixed part 81 which is provided to the rear end of the reflective part 82 and is fixed to the first heat dissipation plate 30. The reflective member 80 is fixed to the first heat dissipation plate 30 to which the semiconductor light emitting element (the LED 10) is mounted. Therefore, it is possible to precisely keep a positional relation between the semiconductor light emitting element and the reflective member 80.

Further, the vehicle 100 includes the lighting device 300 and the vehicle body 101 to which the lighting device 300 is attached. The vehicle 100 includes the light source unit 1, and hence heat produced by the semiconductor light emitting element (the LED 10) and heat produced by the lighting circuit 20 are dissipated individually and properly. This may lead to improvement of the heat dissipation efficiency.

Figure 9:
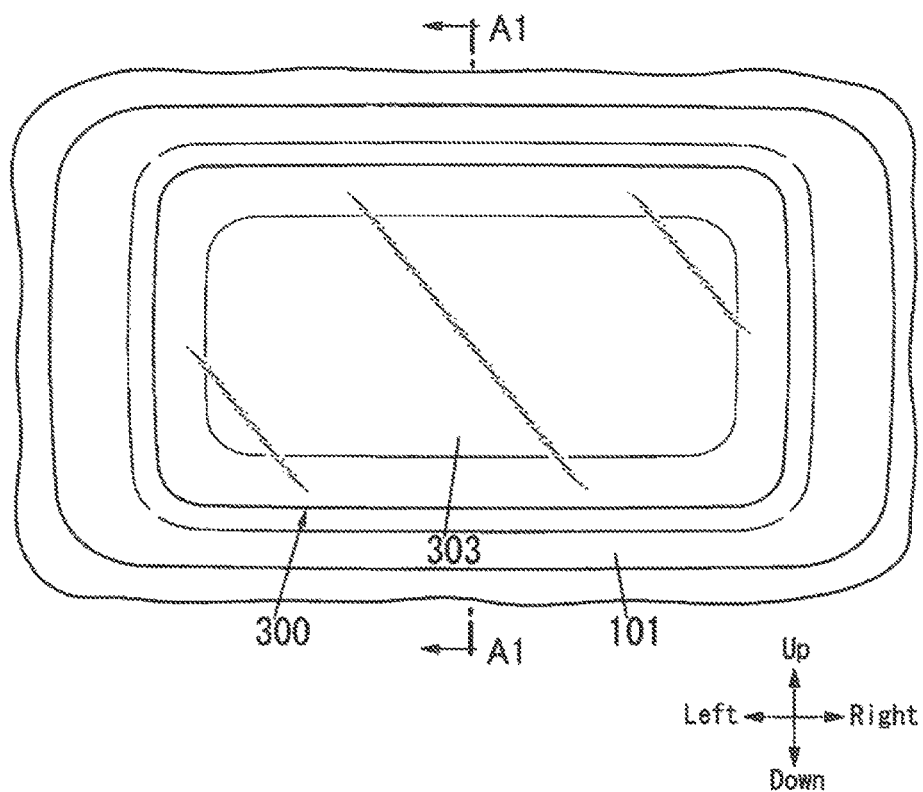
FIG. 9 is a front view of the lighting device.

FIG. 5 and FIG. 9 show the lighting device 300 which includes the light source unit 1 and is a fog lamp. In contrast, FIG. 11 shows the lighting device 200 which includes the light source unit 1*a* of a modification of the present embodiment and is a headlight.

Figure 11:
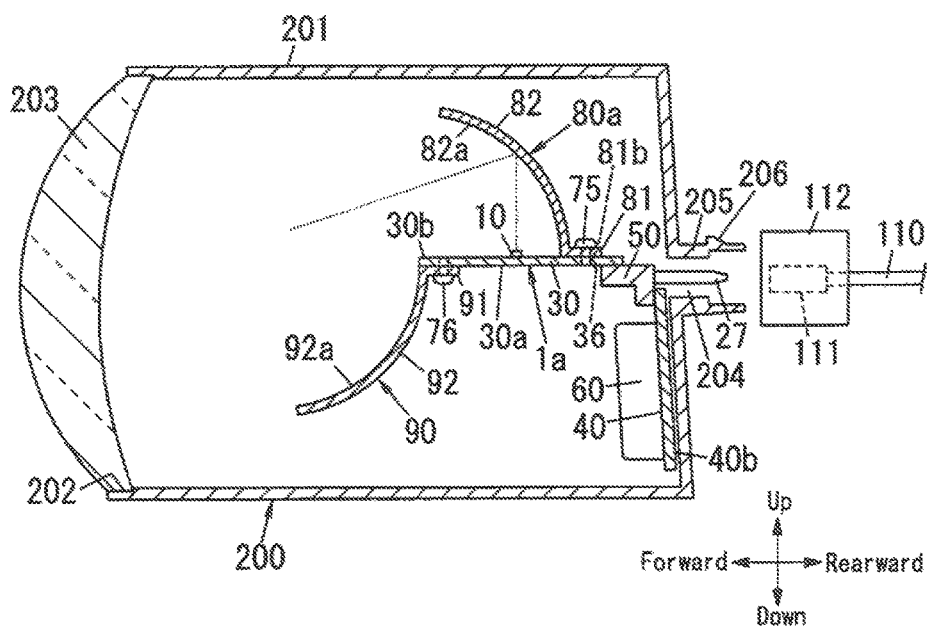
FIG. 11 is a section of a lighting device of a light source unit of a modification of the embodiment.

FIG. 11 is a section of the lighting device 200.

This lighting device 200 includes the light source unit 1*a*, a case 201 having a box shape with an opening 202, and a lens 203 (a light-transmissive member) attached to the case 201 to cover the opening 202 of the case 201.

The light source unit 1*a* is accommodated in the case 201. In this light source unit 1*a*, the LED 10 serving as the semiconductor light emitting element is mounted on the face 30*b* which is the farther from the second heat dissipation plate 40, of the two faces 30*a* and 30*b* in the thickness direction of the first heat dissipation plate 30. The insulating film is formed on the surface of the mounting face 30*b*. The LED 10 is mounted on the surface of this insulating film. Further, the socket connector 32 and circuit wiring (e.g., circuit wiring made of a metal film such as copper foil) electrically interconnecting the socket connector 32 and the LED 10 are formed on the surface of the insulating film. Note that, components common to the light source unit 1*a* and the light source unit 1 are designated by common reference sings to omit redundant explanations.

The reflective member 80*a* is attached to the mounting face 30*b* of the first heat dissipation plate 30 so as to reflect, forward, light emitted upward from the LED 10. The reflective member 80*a* has a similar structure to the reflective member 80 illustrated in FIG. 5, and therefore common components are designated by the common reference sings to omit redundant explanation.

The reflective member 80*a* is attached to the first heat dissipation plate 30 by fitting a screw 75 into a screw hole 36 of the first heat dissipation plate 30 through a hole 81*b* of the fixed part 81. The reflective part 82 of the reflective member 80*a* protrudes forward and upward from the front end of the fixed part 81. The reflective part 82 is formed to have such a sectional shape that a distance from the first heat dissipation plate 30 becomes gradually greater toward a front end of the reflective part 82 than at a rear end of the reflective part 82. The reflective part 82 has two faces in a thickness direction thereof, and one of the two faces which is the closer to the LED 10 serves as the reflective face 82a for reflecting light of the LED 10. The reflective face 82a includes a paraboloidal surface with a focal point at a position of the LED 10. Therefore, light emitted from the LED 10 is reflected by the reflective face 82a, and thus travels forward. Note that, to improve reflectivity, the reflective face 82a may be plated with silver, for example. Note that, the fixed part 81 is screwed to the first heat dissipation plate 30. However, the fixed part 81 may be fixed to the first heat dissipation plate 30 by a method other than screwing. For example, the fixed part 81 may be fixed to the first heat dissipation plate 30 by an appropriate method such as welding, swaging, and snap fitting.

The case 201 is a molded product of synthetic resin such as PBT, for example. The case 201 has a box shape with a front face including the opening 202. The light source unit 1a is accommodated in the case 201 so that the second heat dissipation plate 40 is in contact with a rear wall of the case 201. The first heat dissipation plate 30 is placed inside the case 201 so as to be closer to the opening 202 than the second heat dissipation plate 40 is.

The case 201 is provided at its rear wall with a through hole 204 for exposing the insertion terminal 27 outside. The through hole 204 is surrounded by a surrounding wall 205 in a hollow cylindrical or prism shape. The connection terminals 111 of the female connector are provided to the end of the power supply cable 110 extending from the DC power supply 120, and the housing 112 in a hollow cylindrical or prism shape is attached to the end so as to surround side of the connection terminals 111. When the surrounding wall 205 is inserted into the housing 112, the connection terminals 111 of the female connector are connected to the insertion terminals 27 of the male connector, and thus the DC power supply 120 is electrically connected to the lighting circuit 20. Further, when the surrounding wall 205 is inserted into the housing 112, a protrusion 206 provided to an external side of the surrounding wall 205 is fitted into a recess provided to the internal side of the housing 112, and thereby connection between the housing 112 and the surrounding wall 205 can be kept.

The lens 203 is made of transparent synthetic resin (e.g., polycarbonate) or glass. The lens 203 is attached to the case 201 to cover the opening 202. The lens 203 receives direct light from the LED 10 and/or reflected light by the reflective member 80a. The lens 203 controls distribution of light.

Further, there is a reflective member 90 attached to the face 30a which is the closer to the second heat dissipation plate 40, of the two faces 30a and 30b in the thickness direction of the first heat dissipation plate 30. The reflective member 90 includes a fixed part 91 and a reflective part 92. The fixed part 91 is fastened to the lower face 30a of the first heat dissipation plate 30 with a screw 76. The reflective part 92 protrudes forward and downward from the front end of the fixed part 91. This reflective part 92 is placed in front of the second heat dissipation plate 40, and thereby conceals the second heat dissipation plate 40 from the front side. Note that, it is preferable that a face 92a directed to the opening 202 of the reflective part 92 be plated with silver, for example. Note that, the fixed part 91 is screwed to the first heat dissipation plate 30. However, the fixed part 91 may be fixed to the first heat dissipation plate 30 by a method other than screwing. For example, the fixed part 91 may be fixed to the first heat dissipation plate 30 by an appropriate method such as welding, swaging, and snap fitting. As apparent from the above, in the lighting device 200, the semiconductor light emitting element (the LED 10) may be mounted on the face 30b which is the farther from the second heat dissipation plate 40, of the two faces 30a and 30b in the thickness direction of the first heat dissipation plate 30.

Accordingly, it is possible to provide the lighting device 200 in which the semiconductor light emitting element is mounted on the face 30b farther from the second heat dissipation plate 40, of the two faces 30a and 30b in the thickness direction of the first heat dissipation plate 30.

As apparent from the above embodiment, the light source unit (1; 1a) of the first aspect according to the present disclosure includes a semiconductor light emitting element (10), a lighting circuit (20), a first heat dissipation plate (30), a second heat dissipation plate (40), a wiring member (29), and an interconnection member (50). The lighting circuit (20) is configured to operate the semiconductor light emitting element (10). The semiconductor light emitting element (10) is placed on the first heat dissipation plate (30). The lighting circuit (20) is placed on the second heat dissipation plate (40). The wiring member (29) electrically interconnects the semiconductor light emitting element (10) and the lighting circuit (20). The first heat dissipation plate (30) and the second heat dissipation plate (40) are attached to the interconnection member (50). The interconnection member (50) is lower in thermal conductivity than the first heat dissipation plate (30) and the second heat dissipation plate (40).

The light source unit (1; 1a) of the second aspect according to the present disclosure would be realized in combination with the first aspect. In the second aspect, the interconnection member (50) has a first attachment face (50a) and a second attachment face (50b) which are in a positional relation in which an imaginary plane including the first attachment face (50a) crosses an imaginary plane including the second attachment face (50b). The first heat dissipation plate (30) is attached to the first attachment face (50a). The second heat dissipation plate (40) is attached to the second attachment face (50b).

The light source unit (1; 1a) of the third aspect according to the present disclosure would be realized in combination with the first or second aspect. The third aspect further includes an electrically conductive member (130) electrically interconnecting the first heat dissipation plate (30) and the second heat dissipation plate (40).

The light source unit (1; 1a) of the fourth aspect according to the present disclosure would be realized in combination with the third aspect. In the fourth aspect, the electrically conductive member (130) is formed so that an amount of heat transferred between the first heat dissipation plate (30) and the second heat dissipation plate (40) through the electrically conductive member (130) is smaller than an amount of heat transferred between the first heat dissipation plate (30) and the second heat dissipation plate (40) through the interconnection member (50).

The light source unit (1; 1a) of the fifth aspect according to the present disclosure would be realized in combination with the third or fourth aspect. In the fifth aspect, areas of regions, thermally coupled with the first heat dissipation plate (30) and the second heat dissipation plate (40), of the electrically conductive member (130) are smaller than areas of regions, thermally coupled with the first heat dissipation plate (30) and the second heat dissipation plate (40), of the interconnection member (50), respectively.

The light source unit (1; 1a) of the sixth aspect according to the present disclosure would be realized in combination with any one of the third to fifth aspects. In the sixth aspect, the electrically conductive member (130) includes a contact piece (133) which is flexible. The contact piece (133) is in contact with a surface of one of the first heat dissipation plate (30) and the second heat dissipation plate (40). The electrically conductive member (130) is attached to the other of the first heat dissipation plate (30) and the second heat dissipation plate (40).

The light source unit (1; 1a) of the seventh aspect according to the present disclosure would be realized in combination with the sixth aspect. In the seventh aspect, a heat dissipation plate which is one of the first heat dissipation plate (30) and the second heat dissipation plate (40) and is in contact with the contact piece (133) includes a first recess (33) for receiving the contact piece (133).

The light source unit (1; 1a) of the eighth aspect according to the present disclosure would be realized in combination with any one of the first to seventh aspects. The eighth aspect further includes an electrically conducting member (27) for energizing the lighting circuit (20). The interconnection member (50) includes a second recess (53) for receiving part of the electrically conducting member (27).

The light source unit (1; 1a) of the ninth aspect according to the present disclosure would be realized in combination with the eighth aspect. In the ninth aspect, the electrically conducting member (27) includes a second terminal (27) electrically connected to a first terminal (111) of a power supply cable (110).

The lighting device (200; 300) of the tenth aspect according to the present disclosure includes: the light source unit (1, 1a) of any one of the first to ninth aspects; a case (201; 301) including an opening (202; 302) and accommodating the light source unit (1, 1a); and a light-transmissive member (203; 303) attached to the case (201; 301) to cover the opening (202; 302).

The lighting device (200; 300) of the eleventh aspect according to the present disclosure would be realized in combination with the tenth aspect. In the eleventh aspect, the opening (202; 302) is in a front side of the case (201; 301). The second heat dissipation plate (40) has a first face (40a) and a second face (40b) in a thickness direction of the second heat dissipation plate (40). The second face (40b) of the second heat dissipation plate (40) is placed opposite a rear side of the case (201; 301) inside the case (201; 301). The first heat dissipation plate (30) is placed inside the case (201; 301) so as to be closer to the opening (202; 302) than the second heat dissipation plate (40) is. The lighting circuit (20) is placed on the first face (40a) of the second heat dissipation plate (40).

The lighting device (300) of the twelfth aspect according to the present disclosure would be realized in combination with the eleventh aspect. The twelfth aspect further includes a reflective member (80). The semiconductor light emitting element (10) is placed on a face (30a) which is closer to the second heat dissipation plate (40), of two faces (30a, 30b) in a thickness direction of the first heat dissipation plate (30). The reflective member (80) includes a reflective part (82) and is placed inside the case (301) so as to be closer to the opening (302) than the second heat dissipation plate (40) is, with the reflective part (82) being opposite the semiconductor light emitting element (10). The reflective part (82) has a reflective face (82a) which becomes gradually greater in a distance from the first heat dissipation plate (30) toward a front end of the reflective part (82) than at a rear end of the reflective part (82). The lighting circuit (20) is placed between the reflective part (82) of the reflective member (80) and the second heat dissipation plate (40).

The lighting device (300) of the thirteenth aspect according to the present disclosure would be realized in combination with twelfth aspect. The lighting circuit (20) is constituted by multiple electric components (26) arranged so that a distance (L2) of a relatively tall electric component (26a) of the multiple electric components (26) to the interconnection member (50) is longer than a distance (L1) of a relatively short electric component (26b) of the multiple electric components (26) to the interconnection member (50).

The lighting device (200) of the fourteenth aspect according to the present disclosure would be realized in combination with the eleventh aspect. The fourteenth aspect further includes a reflective member (80). The semiconductor light emitting element (10) is placed on a face (30b) which is farther from the second heat dissipation plate (40), of two faces (30a, 30b) in a thickness direction of the first heat dissipation plate (30). The reflective member (80) includes a reflective part (82) and is placed inside the case (201) with the reflective part (82) being opposite the semiconductor light emitting element (10). The reflective part (82) has a reflective face (82a) which becomes gradually greater in a distance from the first heat dissipation plate (30) toward a front end of the reflective part (82) than at a rear end of the reflective part (82).

The lighting device (200; 300) of the fifteenth aspect according to the present disclosure would be realized in combination with any one of the twelfth to fourteenth aspects. In the fifteenth aspect, the reflective member (80) further includes a fixed part (81) which is provided to the rear end of the reflective part (82) and is fixed to the first heat dissipation plate (30).

The vehicle (100) of the sixteenth aspect according to the present disclosure includes: the lighting device (200; 300) of any one of the tenth to fifteenth aspects; and a vehicle body (101) to which the lighting device (200; 300) is attached.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light source unit, comprising:
a semiconductor light emitting element;
a lighting circuit configured to operate the semiconductor light emitting element;
a first heat dissipation plate on which the semiconductor light emitting element is thermally connected to dissipate heat produced by the semiconductor light emitting element;
a second heat dissipation plate on which the lighting circuit is thermally connected to dissipate heat produced by the lighting circuit; and
an interconnection member to which the first heat dissipation plate and the second heat dissipation plate are attached such that the first heat dissipation plate and the second heat dissipation plate are not directly connected to each other and the first heat dissipation plate is not thermally connected to the second heat dissipation plate except for the interconnection member and an electrically conductive member electrically interconnecting the first heat dissipation plate and the second heat dissipation plate, the interconnection member being lower in thermal conductivity than the first heat dissipation plate and the second heat dissipation plate, the electrically conductive member being formed so that an amount of heat transferred between the first heat dissipation plate and the second heat dissipation plate through the electrically conductive member is smaller than an amount of heat transferred between the first heat dissipation plate and the second heat dissipation plate through the interconnection member.

2. The light source unit of claim 1, wherein:
the interconnection member has a first attachment face and a second attachment face which are in a positional relation in which an imaginary plane including the first attachment face crosses an imaginary plane including the second attachment face;
the first heat dissipation plate is attached to the first attachment face; and
the second heat dissipation plate is attached to the second attachment face.

3. The light source unit of claim 1, further comprising an electrically conductive member electrically interconnecting the first heat dissipation plate and the second heat dissipation plate.

4. The light source unit of claim 3, wherein
the electrically conductive member is formed so that an amount of heat transferred between the first heat dissipation plate and the second heat dissipation plate through the electrically conductive member is smaller than an amount of heat transferred between the first heat dissipation plate and the second heat dissipation plate through the interconnection member.

5. The light source unit of claim 3, wherein
areas of regions, thermally coupled with the first heat dissipation plate and the second heat dissipation plate, of the electrically conductive member are smaller than areas of regions, thermally coupled with the first heat dissipation plate and the second heat dissipation plate, of the interconnection member, respectively.

6. The light source unit of claim 3, wherein:
the electrically conductive member includes a contact piece which is flexible;
the contact piece is in contact with a surface of one of the first heat dissipation plate and the second heat dissipation plate; and
the electrically conductive member is attached to the other of the first heat dissipation plate and the second heat dissipation plate.

7. The light source unit of claim 6, wherein:
a heat dissipation plate which is one of the first heat dissipation plate and the second heat dissipation plate and is in contact with the contact piece includes a first recess for receiving the contact piece.

8. The light source unit of claim 1, further comprising an electrically conducting member for energizing the lighting circuit,
the interconnection member including a second recess for receiving part of the electrically conducting member.

9. The light source unit of claim 8, wherein
the electrically conducting member includes a second terminal electrically connected to a first terminal of a power supply cable.

10. A lighting device comprising:
the light source unit of claim 1;
a case including an opening and accommodating the light source unit; and
a light-transmissive member attached to the case to cover the opening.

11. The lighting device of claim 10, wherein:
the opening is in a front side of the case,
the second heat dissipation plate has a first face and a second face in a thickness direction of the second heat dissipation plate;
the second face of the second heat dissipation plate is placed opposite a rear side of the case inside the case;
the first heat dissipation plate is placed inside the case so as to be closer to the opening than the second heat dissipation plate is; and
the lighting circuit is placed on the first face of the second heat dissipation plate.

12. The lighting device of claim 11, further comprising a reflective member,
the semiconductor light emitting element being placed on a face which is closer to the second heat dissipation plate, of two faces in a thickness direction of the first heat dissipation plate,
the reflective member including a reflective part and placed inside the case so as to be closer to the opening than the second heat dissipation plate is, with the reflective part being opposite the semiconductor light emitting element;
the reflective part having a reflective face which becomes gradually greater in a distance from the first heat dissipation plate toward a front end of the reflective part than at a rear end of the reflective part; and
the lighting circuit being placed between the reflective part of the reflective member and the second heat dissipation plate.

13. The lighting device of claim 12, wherein:
the lighting circuit is constituted by multiple electric components arranged so that a distance of a relatively tall electric component of the multiple electric components to the interconnection member is longer than a distance of a relatively short electric component of the multiple electric components to the interconnection member.

14. The lighting device of claim 11, further comprising a reflective member,
the semiconductor light emitting element being placed on a face which is farther from the second heat dissipation plate, of two faces in a thickness direction of the first heat dissipation plate,
the reflective member including a reflective part and placed inside the case with the reflective part being opposite the semiconductor light emitting element; and
the reflective part having a reflective face which becomes gradually greater in a distance from the first heat dissipation plate toward a front end of the reflective part than at a rear end of the reflective part.

15. The lighting device of claim 12, wherein
the reflective member further includes a fixed part which is provided to the rear end of the reflective part and is fixed to the first heat dissipation plate.

16. A vehicle comprising:
the lighting device of claim 10; and
a vehicle body to which the lighting device is attached.

* * * * *